United States Patent
Liu

(10) Patent No.: US 9,313,292 B2
(45) Date of Patent: Apr. 12, 2016

(54) METHOD, APPARATUS AND SYSTEM FOR DISPLAY CONTROL

(71) Applicant: Tencent Technology (Shenzhen) Company Limited, Shenzhen (CN)

(72) Inventor: Haipeng Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/407,901

(22) PCT Filed: Jun. 9, 2013

(86) PCT No.: PCT/CN2013/077098
§ 371 (c)(1),
(2) Date: Dec. 12, 2014

(87) PCT Pub. No.: WO2013/185599
PCT Pub. Date: Dec. 19, 2013

(65) Prior Publication Data
US 2015/0163317 A1     Jun. 11, 2015

(30) Foreign Application Priority Data

Jun. 14, 2012 (CN) .......................... 2012 1 0195875

(51) Int. Cl.
*H04L 29/08* (2006.01)
*G06F 3/0484* (2013.01)
*G06F 9/445* (2006.01)

(52) U.S. Cl.
CPC ........ *H04L 67/2828* (2013.01); *G06F 3/04842* (2013.01); *G06F 8/60* (2013.01)

(58) Field of Classification Search
CPC ... G06F 8/60; G06F 3/04842; H04L 67/2828; H04L 29/08
See application file for complete search history.

(56) References Cited

U.S. PATENT DOCUMENTS

| 8,806,320 | B1* | 8/2014 | Abdo | G06F 17/30017 715/203 |
| 2009/0125812 | A1* | 5/2009 | Blinnikka | G06F 17/30056 715/716 |
| 2012/0036442 | A1* | 2/2012 | Dare | G06F 8/60 715/736 |
| 2013/0042017 | A1* | 2/2013 | Zhang | H04H 20/95 709/231 |
| 2015/0095167 | A1* | 4/2015 | Marshall | G06Q 30/02 705/14.73 |

FOREIGN PATENT DOCUMENTS

| CN | 101873325 A | 10/2010 |
| CN | 102209140 A | 10/2011 |

(Continued)

*Primary Examiner* — Abdullahi E Salad
(74) *Attorney, Agent, or Firm* — Patterson + Sheridan LLP

(57) ABSTRACT

The invention discloses a method, apparatus and system for display control and belongs to Flash playing field. The method comprises: receiving an event notification message sent by a terminal; acquiring Flash objects for implementing an event; operating computing objects in the acquired Flash objects to obtain playing data for implementing the event; and sending the playing data to the terminal so that the terminal updates a Flash currently played in accordance with the playing data and plays the playing data. A server acquires and operates the computing objects in the Flash objects for implementing the event after receiving the event notification message and sends the playing data obtained to the terminal for playing. The invention avoids network resource waste due to downloading all the Flash objects to the terminal and thus saves precious network traffic of a user.

16 Claims, 9 Drawing Sheets

(56) References Cited

FOREIGN PATENT DOCUMENTS

| CN | 102238151 A | 11/2011 |
| JP | 2006502457 A | 1/2006 |
| JP | 2007109143 A | 4/2007 |
| JP | 2012185617 A1 | 9/2012 |
| WO | 2011/080809 A1 | 7/2011 |

* cited by examiner

METHOD, APPARATUS AND SYSTEM FOR DISPLAY CONTROL

This application claims the priority of the Chinese patent application No. 201210195875.2 filed in the State Intellectual Property Office of The P.R.C on Jun. 14, 2012 and entitled "METHOD, APPARATUS AND SYSTEM FOR DISPLAY CONTROL", the entire of which is incorporated herein by reference.

FIELD OF THE INVENTION

The invention relates to Flash playing field, and in particular to a method, apparatus and system for display control.

BACKGROUND

With the development of Flash technique, terminals or web pages generally employ Flash application programs as carriers of various software or games, wherein the Flash application program is constituted by application logics and media resources including independent Flash objects.

In prior art, when a user opens the Flash application program via a browser or a Flash player installed in the terminal, a server sends the medial resources along with the application logics to the terminal. When the terminal needs a Flash object in the operating of the Flash application program, it abstracts the Flash object from a local media resource via a corresponding application logic and displays the Flash object.

In the process of implementing the invention, the inventor found that there are at least the following problems in the prior art:

The terminal may not use every Flash object when operating the Flash application program. However, in prior art, the server sends all Flash objects to the terminal. As a result, on the one hand, network resources are wasted; and on the other hand, precious traffic of a user having limited network traffic is wasted.

SUMMARY OF THE INVENTION

In order to solve the existing problems, embodiments of the invention provide a method, apparatus and system for display control. Technical solutions are the following:

In the first aspect, an embodiment of the invention provides a method for display control, the method comprising: receiving, by a server, an event notification message sent by a terminal, wherein the event notification message is configured to request for playing data for implementing an event, the event is a control act produced by a user handling a Flash currently played by the terminal via an input device; acquiring, by the server, Flash objects for implementing the event, wherein the Flash objects include playing objects and computing objects, the playing objects comprise at least one of figures, images, words and sounds, and the computing objects refer to operation logics which process the playing objects to implement the event; operating, by the server, the computing objects in the acquired Flash objects to obtain playing data for implementing the event, wherein the playing data comprises display data and sound data; sending, by the server, the playing data to the terminal so that the terminal updates a Flash currently played in accordance with the playing data and plays the playing data.

In the second aspect, an embodiment of the invention provides a server comprising a receiver, a processor, a transmitter and a memory. The receiver is configured to receive an event notification message sent by a terminal, wherein the event notification message is configured to request for playing data for implementing an event, and the event is a control act produced by a user handling a Flash currently played by the terminal via an input device. The processor is configured to acquire Flash objects for implementing the event, wherein the Flash objects comprise playing objects and computing objects, the playing objects comprise at least one of figures, images, words and sounds, and the computing objects refer to operation logics which process the playing objects to implement the event. The processor is further configured to operate the computing objects in the acquired Flash objects to obtain the playing data for implementing the event, wherein the playing data comprises display data and sound data. The transmitter is configured to send the playing data to the terminal so that the terminal updates the Flash currently played in accordance with the playing data and plays the playing data.

In the third aspect, an embodiment of the invention also provides a method for display control, the method comprising: monitoring, by a terminal, an event of user interaction, wherein the event is a control act produced by a user handling a Flash currently played by the terminal via an input device; acquiring, by the terminal, Flash objects for implementing the event of user interaction when capturing the event, wherein the Flash objects comprise playing objects and computing objects, the playing objects comprise at least one of figures, images, words and sounds, and the computing objects refer to operation logics which process the playing objects to implement the event; determining, by the terminal, computing objects operable by the terminal and computing objects inoperable by the terminal in the acquired Flash objects in accordance with its own computing resources; by the terminal, operating the computing objects operable by itself to obtain first playing data for implementing the event, notifying the computing objects inoperable by the terminal to a server, and receiving second playing data returned and obtained by the server operating the computing objects inoperable by the terminal; by the terminal, updating a Flash currently played in accordance with the first playing data and the second playing data and playing the first playing data and the second playing data, wherein the first playing data and second playing data comprise display data and sound data.

In the fourth aspect, an embodiment of the invention provides a method for display control, the method comprising: receiving, by a server, a notification sent by a terminal, wherein the notification is configured to identify computing objects inoperable by the terminal, which are obtained by the terminal when determining computer objects operable by the terminal and computing objects inoperable by the terminal in acquired Flash objects in accordance with its own computing resources, and the Flash objects are flash objects for implementing an event of user interaction acquired when the terminal monitors the event of user interaction and captures the event of user interaction; operating, by the server, the computing objects inoperable by the terminal to obtain second playing data for implementing the event; sending, by the server, the second playing data obtained by operating the computing objects inoperable by the terminal to the terminal so that the terminal updates a Flash currently played in accordance with first playing data and the second playing data and plays the first playing data and the second playing data, wherein the first playing data is playing data for implementing the event obtained by the terminal operating the computing objects operable by the terminal.

In the fifth aspect, an embodiment of the invention provides a terminal comprising a processor, a memory, a receiver, and a transmitter. The processor is configured to monitor an event of user interaction, wherein the event of user interaction is a control act produced by a user handling a Flash currently played by the terminal via an input device. The processor is further configured to acquire Flash objects for implementing the event of user interaction when capturing the event of user interaction, wherein the Flash objects comprise playing objects and computing objects, the playing objects comprise at least one of figures, images, words and sounds, and the computing objects refer to operation logics which process the playing objects to implement the event. The processor is further configured to determine computing objects operable by the terminal and computing objects inoperable by the terminal in acquired Flash objects in accordance with its own computing resources. The processor is further configured to operate the computing objects operable by the terminal to obtain first playing data for implementing the event. The transmitter is configured to notify the computing objects inoperable by the terminal to a server. The receiver is configured to receive second playing data returned and obtained by the server operating the computing objects inoperable by the terminal. The processor is further configured to updates a Flash currently played in accordance with the first playing data and the second playing data and plays the first playing data and the second playing data, wherein the first playing data and the second playing data comprise display data and sound data.

In the sixth aspect, the server comprises a receiver, a processor, a memory, and a transmitter. The receiver is configured to receive a notification sent by the terminal, wherein the notification is configured to identify computing objects inoperable by the terminal, which are obtained by the terminal when determining the computing objects operable by the terminal and the computing objects inoperable by the terminal in the acquired Flash objects in accordance with its own computing resources, and the Flash objects are Flash objects for implementing the event of user interaction, which are acquired when the terminal monitors the event of user interaction and captures the event of user interaction. The processor is configured to operate the computing objects inoperable by the terminal to obtain the second playing data for implementing the event. The transmitter is configured to send the second playing data obtained by operating the computing objects inoperable by the terminal to the terminal, so that the terminal updates the Flash currently played in accordance with the first playing data and the second playing data and plays the first playing data and the second playing data, wherein the first playing data is playing data for implementing the event obtained by the terminal operating the computing objects operable by the terminal.

In the above embodiments of the invention, the server receives the event notification message sent by the terminal, acquires the Flash objects for implementing the event, operates the computing objects in the acquired Flash objects to obtain the playing data for implementing the event and sends the playing data to the terminal, so that the terminal updates the Flash currently played in accordance with the playing data and plays the playing data, which avoids waste of network resources due to downloading all the Flash objects to the terminal and thus saves precious network traffic of the user.

Moreover, the operating of the computing objects in the Flash objects for implementing the event is complemented by the server, and the terminal merely needs to receive and play the playing data obtained by the server operating the computing objects in the Flash objects for implementing the event, so the computing resources of the terminal can be saved and the computing pressure of the terminal is relieved.

DESCRIPTION OF THE DRAWINGS

In order to illustrating the technical solutions in the embodiments of the invention more clearly, accompany drawings necessary to describe the embodiments are simply illustrated below. Obviously, the accompany drawings illustrated below are merely some embodiments of the invention, and the person skilled in the art can think of other accompany drawings without creative works.

DETAILED DESCRIPTION

Figure 1A:
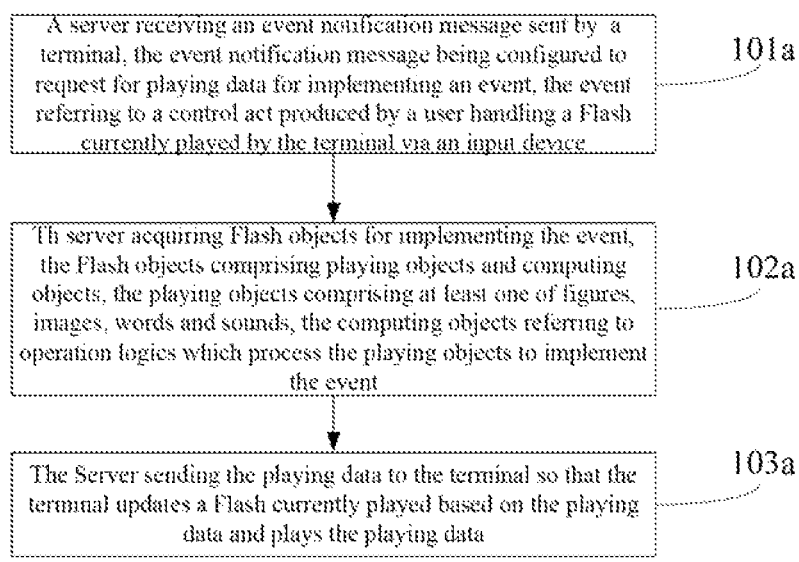
FIG. 1a is a flow diagram of a method for display control provided by an embodiment of the invention.

As shown in FIG. 1a, an embodiment of the invention provides a method for display control, the method including:

Step 101a, a server receives an event notification message sent by a terminal, wherein the event notification message is configured to request for playing data for implementing an event, and the event is a control act produced by a user handling a Flash currently played by the terminal via an input device.

Step 102a, the server acquires Flash objects for implementing the event, wherein the Flash objects comprise playing objects and computing objects, the playing objects comprise at least one of figures, images, words and sounds, and the computing objects refer to operation logics which process the playing objects to implement the event.

Step 103a, the server sends the playing data to the terminal, so that the terminal updates a Flash currently played in accordance with the playing data and plays the playing data.

In the above embodiment of the invention, the server receives the event notification message sent by the terminal, acquires the Flash objects for implementing the event, operates the computing objects in the acquired Flash objects to obtain the playing data for implementing the event and sends the playing data to the terminal, so that the terminal updates the Flash currently played in accordance with the playing data and plays the playing data, which avoids waste of network resources due to downloading all the Flash objects to the terminal and thus saves precious network traffic of the user. Moreover, the operating of the computing objects in the Flash objects for implementing the event is complemented by the server, and the terminal merely needs to receive and play the playing data obtained by the server operating the computing objects in the Flash objects for implementing the event, so the computing resources of the terminal can be saved and the computing pressure of the terminal can be relieved.

Figure 1B:
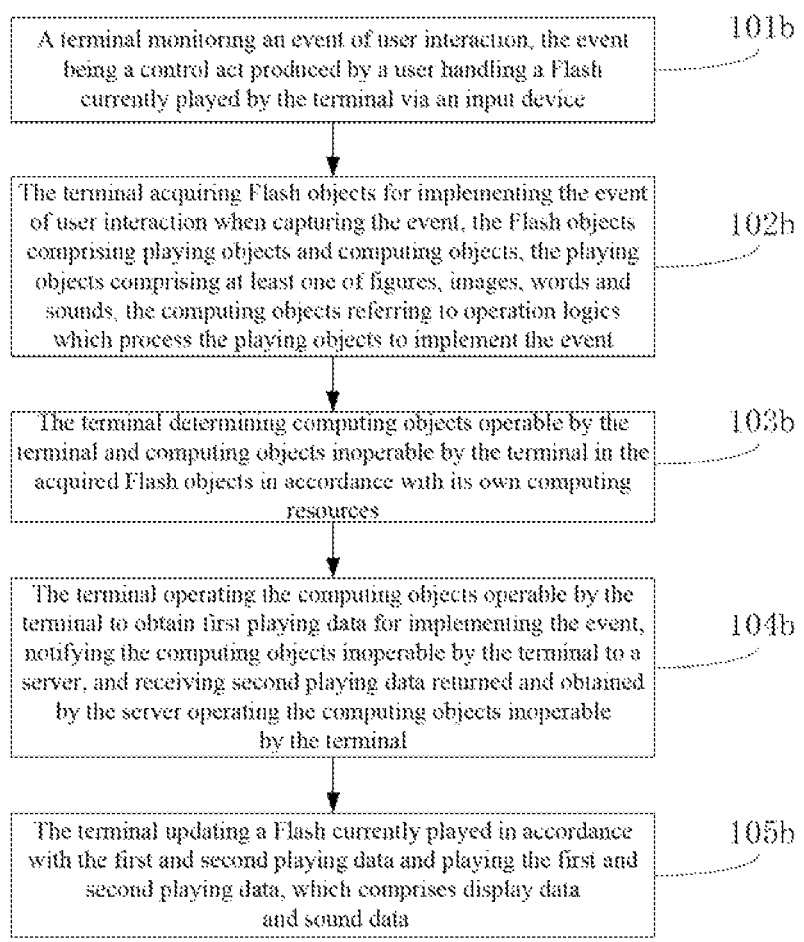
FIG. 1b is a flow diagram of a method for display control provided by another embodiment of the invention.

Furthermore, as shown in FIG. 1b, an embodiment of the invention further provides a method for display control, the method specifically including:

Step 101b, a terminal monitors an event of user interaction, wherein the event is a control act produced by a user handling a Flash currently played by the terminal via an input device.

Step 102b, the terminal acquires Flash objects for implementing the event of user interaction when capturing the event, wherein the Flash objects comprise playing objects and computing objects, the playing objects comprise at least one of figures, images, words and sounds, and the computing objects refer to operation logics which process the playing objects to implement the event.

Step 103b, the terminal determines computing objects operable by the terminal and computing objects inoperable by the terminal in the acquired Flash objects in accordance with its own computing resources.

Step 104b, the terminal operates the computing objects operable by the terminal to obtain first playing data for implementing the event, notifies the computing objects inoperable by the terminal to a server, and receives second playing data returned and obtained by the server operating the computing objects inoperable by the terminal.

Step 105b, the terminal updates the Flash currently played in accordance with the first playing data and the second playing data and plays the first playing data and the second playing data, wherein the first playing data and the second playing data comprise display data and sound data.

In the above embodiment of the invention, the terminal acquires the Flash objects for implementing the event of user interaction when capturing the event, operates the computing objects operable by itself based on its own computing resources to obtain the first playing data for implementing the event, notifies the computing objects inoperable by itself to the server, receives the second playing data returned and obtained by the server operating the computing objects inoperable by the terminal, updates the Flash currently played in accordance with the first playing data and the second playing data, and plays the first playing data and the second playing data, so that the computing for implementing the event is evenly distributed on the terminal and server, the computing amount of the terminal is shifted to the server and the computing pressure of the terminal is relieved.

Figure 2:
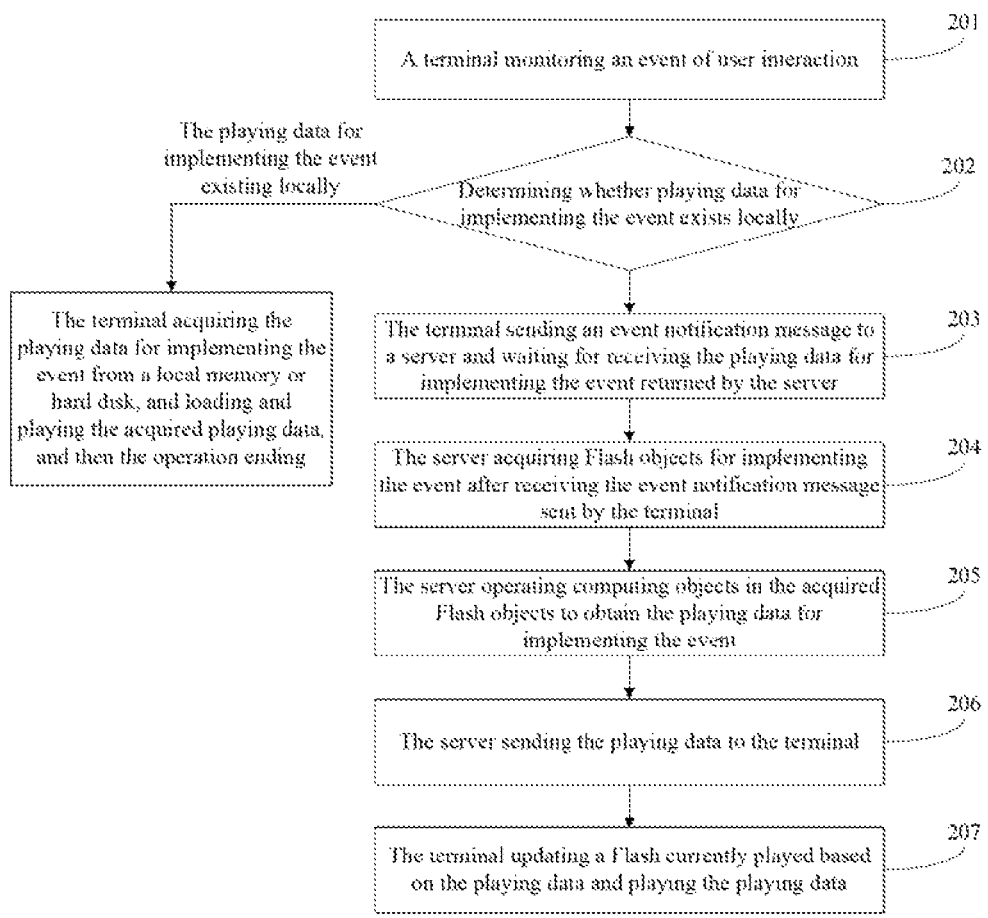
FIG. 2 is a flow diagram of a method for display control provided by another embodiment of the invention.

As shown in FIG. 2, an embodiment of the invention provides a method for display control, the method specifically including:

Step 201, a terminal monitors an event of user interaction, wherein the event is a control act produced by a user handling a Flash currently played by the terminal via an input device.

The input device can comprise a keyboard, a mouse, or a touch pad and so on. The touch pad can be an independent touch pad or a touch portion on a touch screen.

Usually, the event can comprise a Flash playing event, a Flash pause event, a Flash forward event, or a Flash backward event and so on. In a specific application scene of a Flash game, the event can further comprise application function events such as a "feeding pets" event, a "harvesting vegetables" event, a "planting" event, a "ploughing" event, a "sales of goods" event, and so on.

Specifically, the terminal can monitor the event of user interaction via a hardware Application Program Interface (API) corresponding to the input device.

For example, for a Flash animation displayed by the terminal via a Flash player, for example, an application scene of "Smart Ikkyu San", if the user clicks a "spacebar" key on a keyboard, a Flash pause event is produced; if the user clicks a "→" key on the keyboard, a Flash forward event is produced, and so on.

For example, for a Flash game displayed by the Flash displayer, for example, an application scene of "farm", Flash objects currently presented by the "farm" comprise "a farmer", "an idle land", "a land on which things are planted", "a land on which withered things are planted", "walking sheep", "grass", "farm fences", and so on. If the user clicks "an idle land" displayed via the mouse, a "planting" event is produced; if the user clicks "a land on which things are planted" displayed via the mouse, a "harvesting vegetables" event is produced; if the user clicks "a land on which withered things are planted" displayed via the mouse, a "ploughing" event is produced; if the user clicks "grass" displayed via the mouse, a "sheep eating grass" event is produced; if the user clicks any location in the "farm" via the mouse, "a farmer actively walking" event is produced, and so on.

Step 202, the terminal determines whether playing data for implementing the event exists locally when capturing the event of user interaction.

When the playing data for implementing the event exists locally, the terminal acquires the playing data for implementing the event from a local memory or hard disk, loads and plays the acquired playing data, and then the operation ends.

When the playing data for implementing the event does not exist locally, step 203 is performed.

In the case that the playing data for implementing the event exists locally, as the playing data for implementing the event may be ever locally loaded and played, and in the embodiment the terminal stores the playing data ever locally loaded and played in the local memory or hard disk, it is unnecessary to acquire the playing data ever loaded via a network and the playing data can be directly called for and loaded locally, so the loading and playing speed of the playing data for implementing the event can be improved and network resources can be saved and thus user experience can be ensured.

For example, for an application scene of the Flash game "farm" currently presented by the terminal, after the "ploughing" event produced by the user is captured, if the playing data for implementing the "ploughing" event is ever loaded and played, then the playing data for implementing the "ploughing" event can be directly called for from a local buffer. For example, the display data for implementing the "ploughing" event comprises display data that "a farmer walks to an idle land", display data of "planting tools", display data of "seeds", display data that "a farmer plants seeds on an idle land by using a planting tool", and sound data of "sounds of planting". Then, the terminal loads and plays the playing data for implementing the "ploughing" event to implement the ploughing event. That is, the terminal displays "a farmer walks to an idle land and plants seeds on the idle land by using a planting tool" and plays "sounds of planting".

It should be pointed out that the step is a preferably implemented step. In a specific implementation, step 203 can be directly performed while the step can be skipped.

Step 203, the terminal sends an event notification message to a server, the event notification message being configured to request for the playing data for implementing the event, and waits for receiving the playing data for implementing the event returned by the server.

Step 204, the server acquires Flash objects for implementing the event after receiving the event notification message sent by the terminal, wherein the Flash objects comprise playing objects and computing objects, the playing objects comprise at least one of figures, images, words and sounds, and the computing objects refer to operation logics which process the playing objects to implement the event.

Specifically, the server can find out predetermined correspondences in accordance with the event to obtain the Flash objects for implementing the event, wherein the predetermined correspondences are correspondences between the event and the Flash objects for implementing the event.

Preferably, in the embodiment of the invention, the server can process the playing objects in the acquired Flash objects in advance to transform the playing objects to low resource consuming playing objects, so that in subsequent operations of the computing objects in the acquired Flash objects, the low resource consuming playing objects are processed, computing resources are saved, and computing efficiency is improved.

The process of the server processing the playing objects in the acquired Flash objects in advance to transform the playing objects to the low resource consuming playing data can comprise: the server adjusts the display size of the playing objects in the acquired Flash objects to make the display size of the Flash objects for implementing the event consistent with the display size of the terminal, or adjusts the resolution of the playing objects in the acquired Flash objects (for example, bitmap scales the playing objects in the Flash objects for implementing the event) to make the resolution of the Flash objects for implementing the event consistent with the display resolution of the terminal.

Step 205, the server operates the computing objects in the acquired Flash objects to obtain the playing data for implementing the event, wherein the playing data comprises display data and sound data.

Step 206, the server sends the playing data to the terminal.

In a specific implementation of the embodiment of the invention, the server directly sends the playing data to the terminal, or transforms the playing data to Hyper Text MarkUp Language (HTML) format and then sends the playing data of HTML format to the terminal, wherein HTML format can support HTML5 standard format.

Here, the server sends the playing data to the terminal after transforming it to Hyper Text MarkUp Language (HTML) format in order to present the received playing data via a network browser in the case that the terminal does not support a Flash player.

Step 207, the terminal updates a Flash currently played in accordance with the playing data and plays the playing data.

Now, the above implementation is specifically described taking an example as follows:

After receiving an event notification message about the "ploughing" event sent by the terminal, the server acquires playing objects for implementing the "ploughing" event, such as display data of "farmers", display data of "lands on which withered things are planted", display data of "ploughing tools", display data of "idle lands", sound data of "sounds of ploughing", and so on; the server acquires computing objects for processing the acquired playing data, such as computing objects for implementing that "a farmer actively walks to a land on which withered things are planted", computing objects for implementing that "a farmer ploughs a land on which withered things are planted by using a ploughing tool", computing objects for implementing that "a land on which withered things are planted is replaced by an idle land and sounds of ploughing are played", and so on. Then, the server operates the above computing objects to obtain the playing data, such as "a farmer actively walks to a land on which withered things are planted", "a farmer ploughs a land on which withered things are planted by using a ploughing tool", "a land on which withered things are planted is replaced by an idle land and sounds of ploughing are played", and so on. The server sends the playing data obtained by the above operation to the terminal, so that the terminal can directly plays the received playing data, for example, displaying that "a farmer actively walks to a land on which withered things are planted, a farmer ploughs a land on which withered things are planted by using a ploughing tool, and then a land on which withered things are planted is replaced by an idle land" and playing "sounds of ploughing".

In the above technical solution provided by the embodiment, the server receives the event notification message sent by the terminal, acquires the Flash objects for implementing the event, operates the computing objects in the acquired Flash objects to obtain the playing data for implementing the event and sends the playing data to the terminal, so that the terminal updates the Flash currently played in accordance with the playing data and plays the playing data, which avoids waste of network resources due to downloading all the Flash objects to the terminal and thus saves precious network traffic of the user.

Moreover, the operating of the computing objects in the Flash objects for implementing the event is complemented by the server, and the terminal merely needs to receive and play the playing data obtained by the server operating the computing objects in the Flash objects for implementing the event, so the computing resources of the terminal can be saved and the computing pressure of the terminal is relieved.

Figure 3A:
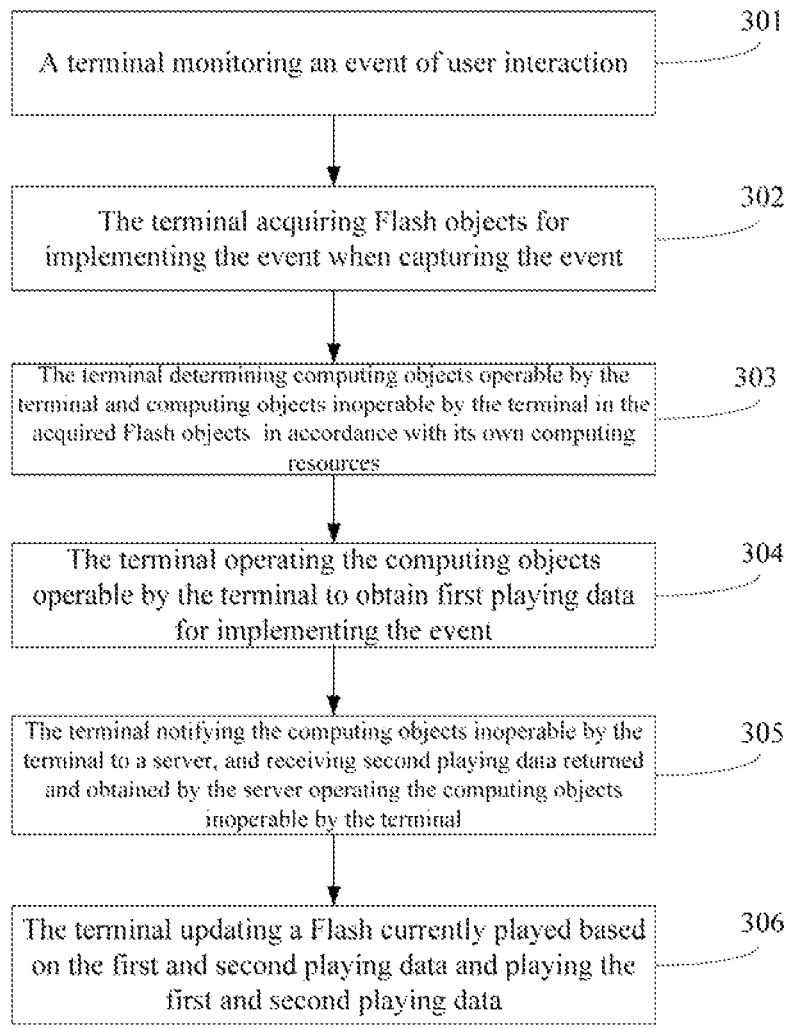
FIG. 3A is a flow diagram of a method for display control provided by another embodiment of the invention.

Furthermore, as shown in FIG. 3, an embodiment of the invention also provides a method for display control, the method specifically including:

Step 301, a terminal monitors an event of user interaction. Please refer to descriptions about step 201 for the descriptions of the event of user interaction, which are not redundantly given.

Step 302, the terminal acquires Flash objects for implementing the event when capturing the event. Please refer to descriptions about step 204 for the detailed descriptions of the Flash objects, which are not redundantly given.

Preferably, the Flash objects for implementing the event are downloaded from a server, and playing objects in the Flash objects are low resource consuming playing objects processed by the server.

Here, the server processes the playing objects in the Flash objects to low resource consuming playing objects in order to reduce the network load when the terminal downloads the Flash objects for implementing the event from the server and to improve the downloading speed of the Flash objects for implementing the event. Meanwhile, the computing performance required by the low resource consuming playing objects is relatively low.

Step 303, the terminal determines computing objects operable by the terminal and computing objects inoperable by the terminal in the acquired Flash objects in accordance with its own computing resources.

As the computing resources of the terminal itself are relatively limited, available computing resources adequate for operating the computing objects cannot be ensured. Therefore, the terminal can determine the computing objects operable by the terminal and the computing objects inoperable by the terminal in the acquired Flash objects based on its own computing resources. The "computing objects operable by the terminal" can also be referred as "computing objects operable by itself" or "computing objects operable by the terminal itself". The "computing objects inoperable by the terminal" can also be referred as "computing objects inoperable by itself" or "computing objects inoperable by the terminal itself".

In a possible implementation, the terminal can compute its own remaining available computing resources in real time, and then determine the computing objects operable by the terminal in the acquired Flash objects in accordance with the amount of the remaining available computing resources. The remaining available computing resources can be learned from physical quantities, such as CPU available resources, GPU available resources, frame rate of Flash playing, and so on. Flash objects beyond the computing capacity of the remaining available computing resources are determined as the computing objects inoperable by the terminal.

It should be pointed out that the "computing objects inoperable by the terminal" are not computing objects absolutely inoperable by the terminal, and are merely computing objects relatively inoperable by the terminal. That is to say, although some computing objects are computing objects actually operable by the terminal, they are determined as the computing objects inoperable by the terminal in order to ensure the fluency of playing a Flash.

Step 304, the terminal operates the computing objects operable by the terminal to obtain first playing data for implementing the event.

Step 305, the terminal notifies the computing objects inoperable by the terminal to a server, and receives second playing data returned and obtained by the server operating the computing objects inoperable by the terminal.

Correspondingly, the server receives a notification sent by the terminal, wherein the notification is configured to identify the computing objects inoperable by the terminal, which are obtained by the terminal when determining the computing objects operable by the terminal and the computing objects inoperable by the terminal in the acquired Flash objects in accordance with its own computing resources, and the Flash objects are Flash objects for implementing the event acquired by the terminal when monitoring the event of user interaction and capturing the event of user interaction.

The server operates the computing objects inoperable by the terminal to obtain the second playing data for implementing the event.

The server sends the second playing data obtained by operating the computing objects inoperable by the terminal to the terminal.

In the embodiment of the invention, please refer to the descriptions about operating the computing objects in the embodiment shown in FIG. 2 for specific descriptions about operating the computing objects, which is not redundantly given.

It should be pointed out that the embodiment of the invention is not limited to the implementing sequence of step 304 and step 305. That is to say, although step 304 is implemented before step 305 in the embodiment of the invention, step 304 can actually be implemented at the same time as step 305, or after step 305.

Step 306, the terminal updates a Flash currently played in accordance with the first playing data and the second playing data and plays the first playing data and the second playing data, wherein the first playing data and the second playing data comprise display data and sound data.

Preferably, when the embodiment of the invention is specifically implemented, the terminal can further transform the first playing data and the second playing data to data of HTML format, so that the acquired first playing data and second playing data can be played by a web browser in the case that the terminal does not support a Flash player.

In the above embodiment of the invention, the terminal acquires the Flash objects for implementing the event of user interaction when capturing the event, operates the computing objects operable by itself based on its own computing resources to obtain the first playing data for implementing the event, notifies the computing objects inoperable by itself to the server, receives the second playing data returned and obtained by the server operating the computing objects inoperable by the terminal, updates the Flash currently played in accordance with the first playing data and the second playing data, and plays the first playing data and the second playing data, so that the computing for implementing the event is evenly distributed on the terminal and the server, the computing amount of the terminal is shifted, and thus the computing pressure of the terminal is relieved.

Furthermore, as the terminal assigns the computing objects inoperable by itself to the server, the server needs to return corresponding second playing data to the terminal. If the terminal determines a lot of computing objects inoperable by itself, the amount of the second playing data returned by the server is large. At this time, the server needs a relatively large bandwidth and more traffic to timely send the second playing data to the terminal. In view of that the bandwidth and traffic of a terminal such as a mobile phone are limited, it is not that the more the computing objects inoperable by itself determined by the terminal the better, and the terminal should determine the number of computing objects inoperable by itself in consideration of available computing resources and available transmission resources. Meanwhile, as the computing load of the terminal, the computing load of the server and the current network bandwidth are varying over time, the computing objects operable by the terminal and the computing objects inoperable by the terminal which are initially determined by the terminal can be dynamically adjusted in subsequent processing in the above method. The dynamic adjustment can be started initiatively by the terminal or by the server.

Figure 3B:
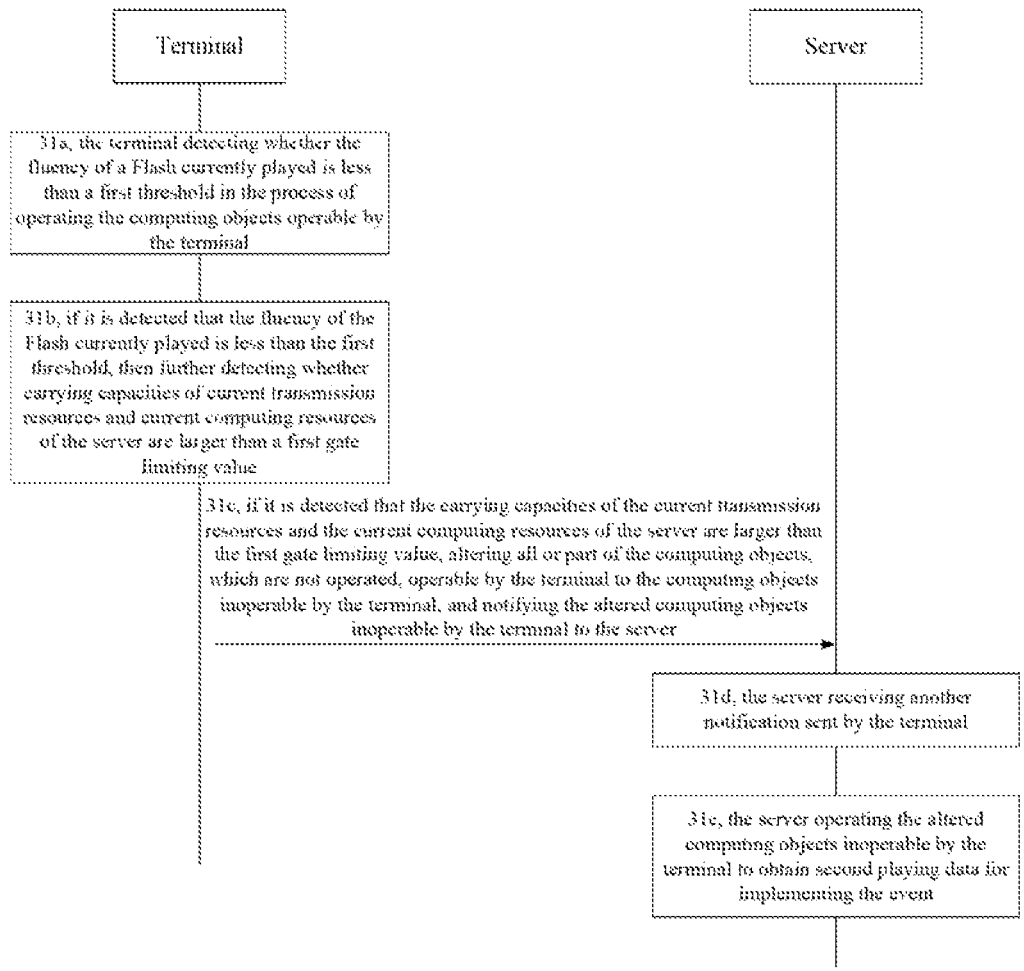
FIG. 3B is a flow diagram of the process of initiatively starting a dynamic adjustment by a terminal.

If the terminal initiatively starts the dynamic adjustment, the above method can further comprise the following substeps shown in FIG. 3B between step 304 and step 306:

Step 31a, detecting whether the fluency of the Flash currently played is less than a first threshold in the process of the terminal operating the computing objects operable by the terminal, wherein the fluency of the Flash currently played can be represented by the frame rate of the Flash currently played.

Step 31b, if it is detected that the fluency of the Flash currently played is less than the first threshold, then further detecting whether the carrying capacities of current transmission resources and current computing resources of the server are larger than a first gate limiting value.

The current transmission resources include a current network bandwidth and a current network available traffic, wherein the current network bandwidth can be initiatively measured by the terminal, or can be fed back to the terminal by the server after measuring when the terminal sends a request message to the server. The current network available traffic can be learned by the terminal based on pre-stored information, or obtained by the terminal querying a relevant operator server.

The current computing resources of the server can be fed back to the terminal by the server when the server sends a query message to the server.

Step 31c, if it is detected that the carrying capacities of the current transmission resources and the current computing resources of the server are larger than the first gate limiting value, then altering all or part of the computing objects, which are not operated, operable by the terminal to the computing objects inoperable by the terminal and notifying the altered computing objects inoperable by the terminal to the server.

That is to say, when detecting that the play of the Flash is not adequately fluent and the current transmission resources and the current computing resources of the server have adequate available carrying capacities, the terminal readjusts part of the computing objects initially operable by the terminal to the computing objects inoperable by the terminal and sends the part of computing objects to the server to operate.

Of course, if it is detected that the carrying capacities of the current transmission resources and the current computing resources of the server are less than the first gate limiting value, which indicates that at least one of the current transmission resources and the current computing resources of the server does not have an adequate available carrying capacity, the terminal continues to preserve the initial assignment and does not make any alteration.

Step 31*d*, the server receives another notification sent by the terminal, wherein the other notification is configured to identify the altered computing objects inoperable by the terminal.

The altered computing objects inoperable by the terminal are computing objects altered by the terminal by the following process: in the process of operating the computing objects operable by the terminal, detecting whether the fluency of the Flash currently played is less than the first threshold; if it is detected that the fluency of the Flash currently played is less than the first threshold, then further detecting carrying capacities of the current transmission resources and the current computing resources of the server are larger than the first gate limiting value; if it is detected that the carrying capacities of the current transmission resources and the current computing load of the server are larger than the first gate limiting value, then altering all or part of the computing objects, which are not operated, operable by the terminal.

Step 31*e*, the server operates the altered computing objects inoperable by the terminal to obtain the second playing data for implementing the event.

Obviously, when the Flash played by terminal is not adequately fluent, the terminal continues to dynamically adjust the assignment of the computing objects between the terminal and the server, so that the computing resources of the terminal, the computing resources of the server, and the transmission resources can be balanced and efficiently utilized.

Figure 3C:
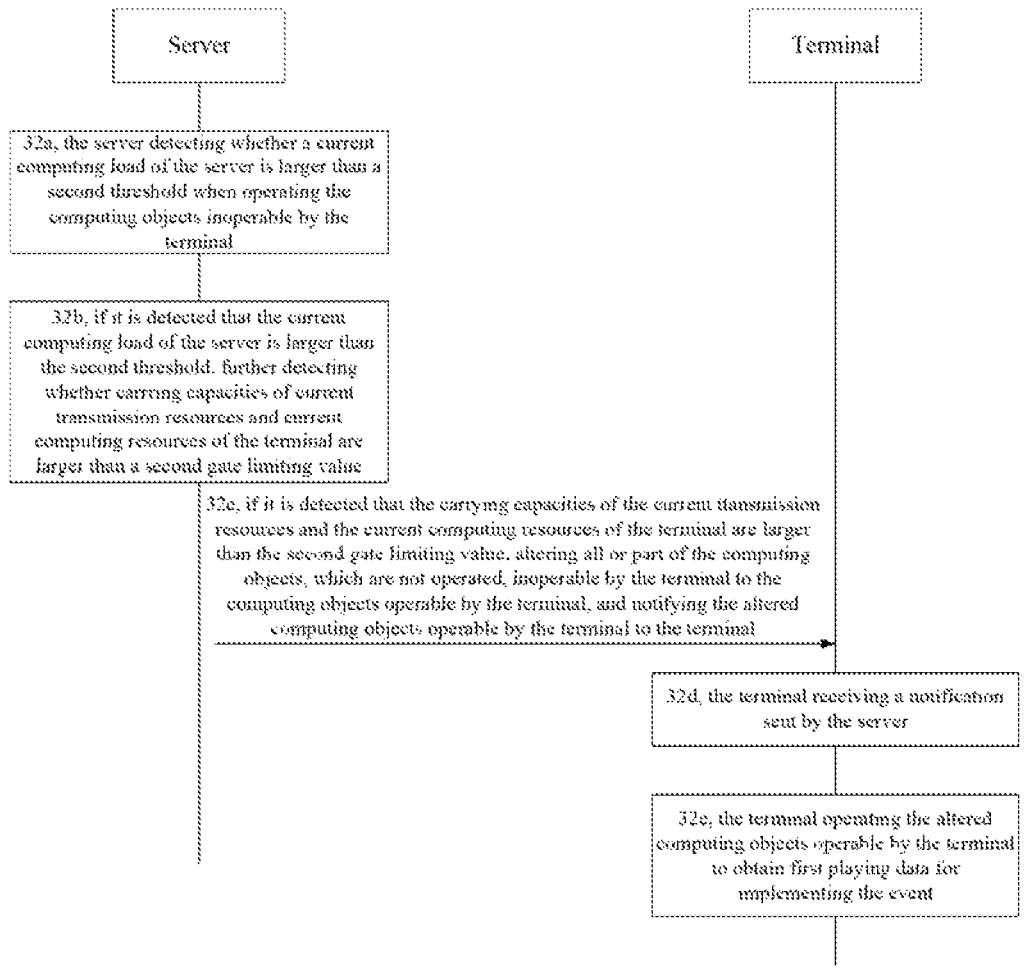
FIG. 3C is a flow diagram of the process of initiatively starting a dynamic adjustment by a server.

If the server initiatively starts the dynamic adjustment, the above process can further comprise the following sub-steps shown in FIG. 3C between step 304 and step 306:

Step 32*a*, detecting whether a current computing load of the server is larger than a second threshold when the server operates the computing objects inoperable by the terminal. The current computing load of the server can be obtained by the server in accordance with its own CPU occupancy ratio, GPU occupancy ratio and so on.

Step 32*b*, if it is detected that the current computing load of the server is larger than the second threshold, then detecting the carrying capacities of the current transmission resources and the current computing resources of the terminal are larger than a second gate limiting value.

The current transmission resources comprise the current network bandwidth and the current network available traffic, wherein the current network bandwidth can be initiatively measured by the server or be fed back to the server by the terminal after measuring when the server sends a request message to the terminal. The current network available traffic can be fed back to the server by the terminal when the server sends a query message to the terminal. The terminal can learn the current network available traffic based on pre-stored information, or the terminal can query a relevant operator server for the current network available traffic.

The current computing resources of the terminal can be fed back to the server by the terminal when the server sends a query message to the terminal.

Step 32*c*, if it is detected that the carrying capacities of the current transmission resources and the current computing resources of the terminal are larger than the second gate limiting value, then altering all or part of the computing objects, which are not operated, inoperable by the terminal to the computing objects operable by the terminal and notifying the altered computing objects operable by the terminal to the terminal.

That is to say, when the server found that its own load is too heavy and the current transmission resources and the current computing resources of the terminal have adequate available carrying capacities, it readjusts a part of computing objects initially inoperable by the terminal to the computing objects operable by the terminal and sends the part of computing objects to the terminal to operate.

Of course, if it is detected that the carrying capacities of the current transmission resources and the current computing resources of the server are less than the second gate limiting value, which indicates that at least one of the current transmission resources and the current computing resources of the terminal does not have an adequate available carrying capacity. At this time, the server continues to preserve initial assignment and does not make any alteration.

Step 32*d*, the terminal receives a notification sent by the server, the notification being configured to identify the altered computing objects operable by the terminal.

The altered computing objects operable by the terminal are computing objects altered by the server by the following process: in the process of operating the computing objects inoperable by the terminal, detecting whether the current computing load of the server is larger than the second threshold; if it is detected that the current computing load of the server is larger than the second threshold, then further detecting whether the carrying capacities of the current transmission resources and the current computing resources of the terminal are larger than the second gate limiting value; if it is detected that the carrying capacities of the current transmission resources and the current computing resources of the terminal are larger than the second gate limiting value, then altering all or part of the computing objects, which are not operated, inoperable by the terminal.

Step 32*e*, the terminal operates the altered computing objects operable by the terminal to obtain the first playing data for implementing the event.

Obviously, when the load of the server is too heavy, the server can dynamically adjust the assignment of the computing objects between the terminal and the server, so that the computing resources of the terminal, the computing resources of the server, and the transmission resources can be balanced and efficiently utilized.

Figure 4:
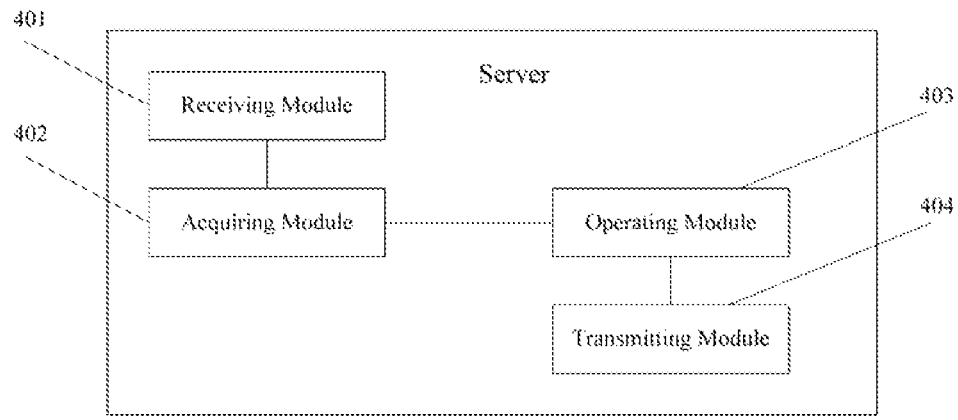
FIG. 4 is a structure diagram of a server provided by an embodiment of the invention.

As shown in FIG. 4, an embodiment of the invention provides a server, which can be specifically the same as that described in the method embodiment shown in FIG. 2. The server comprises a receiving module 401, an acquiring module 402, an operating module 403 and a transmitting module 404.

The receiving module 401 is configured to receive an event notification message sent by a terminal, wherein the event notification message is configured to request for playing data for implementing an event, and the event is a control act produced by a user handling a Flash currently played by the terminal via an input device.

The acquiring module 402 is configured to acquire Flash objects for implementing the event, wherein the Flash objects comprise playing objects and computing objects, the playing objects comprise at least one of figures, images, words and sounds, and the computing objects refer to operating logics which process the playing objects to implement the event.

The operating module 403 is configured to operate the computing objects in the acquired Flash objects to obtain the playing data for implementing the event, wherein the playing data comprises display data and sound data.

The transmitting module 404 is configured to send the playing data to the terminal so that the terminal updates a Flash currently played in accordance with the playing data and plays the playing data.

In the embodiment of the invention, the acquiring module 402 is specifically configured to find out correspondences between the event and the Flash objects for implementing the event based on the event to obtain the Flash objects for implementing the event.

Figure 5:
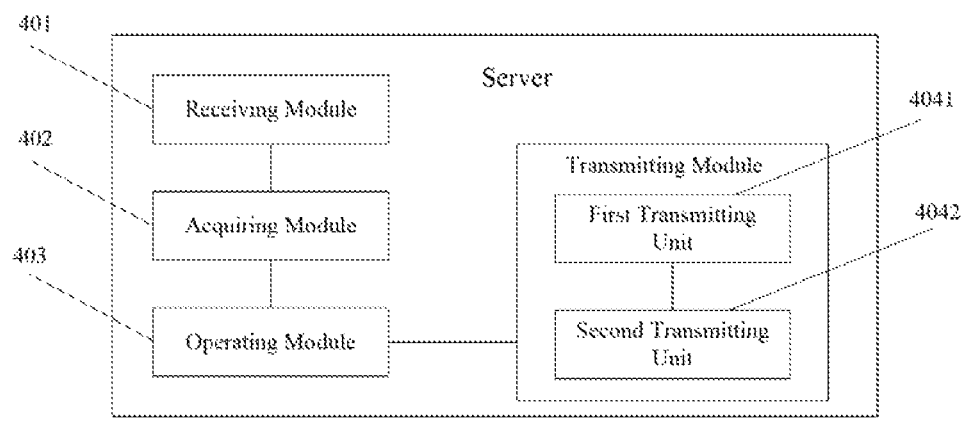
FIG. 5 is a structure diagram of a server provided by another embodiment of the invention.

Furthermore, as shown in FIG. 5, the transmitting module 404 shown in FIG. 4 in accordance with the embodiment of the invention can specifically comprise a first transmitting unit 4041 configured to directly send the playing data to the terminal; or a second transmitting unit 4042 configured to transform the playing data to Hyper Text MarkUp Language (HTML) format and send the playing data of HTML format to the terminal.

Figure 6:
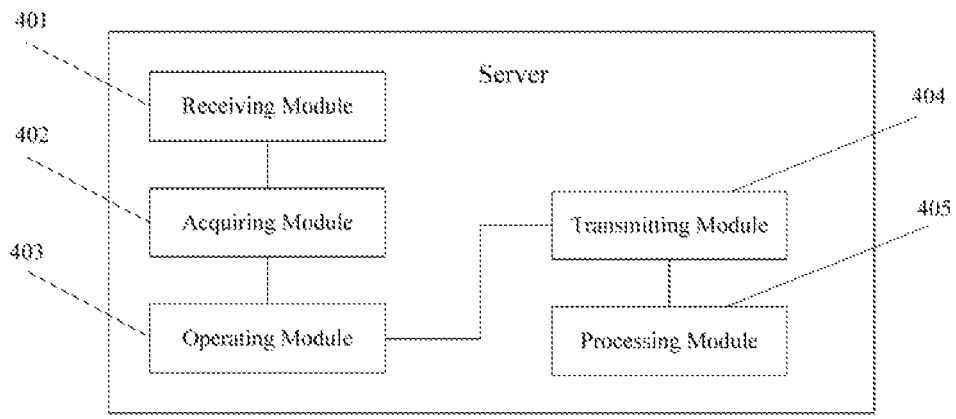
FIG. 6 is a structure diagram of a server provided by another embodiment of the invention.

Furthermore, as shown in FIG. 6, the server shown in FIG. 4 in accordance with the embodiment of the invention can further comprise a processing module 405 configured to process the playing objects in the acquired Flash objects to transform the playing objects to low resource consuming playing objects.

Furthermore, the server can include a receiver, a processor, a transmitter, a memory, and one or more programs, which are stored in the memory and are configured to be executed by one or more processors. In the embodiment, the receiving module 401 and the acquiring module 402 can be implemented by the receiver, the operating module 402 and the processing module 405 can be implemented by the processor, and the transmitting module 404 and the internal units thereof can be implemented by the transmitter.

Figure 7:
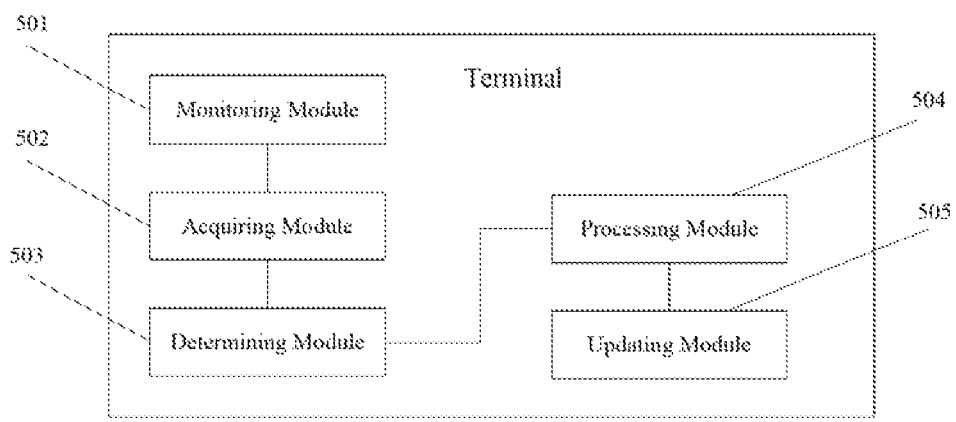
FIG. 7 is a structure diagram of a terminal apparatus provided by an embodiment of the invention.

As shown in FIG. 7, an embodiment of the invention provides a terminal, which is specifically the same as the terminal described in the method embodiment shown in FIG. 3. The terminal comprises a monitoring module 501, an acquiring module 502, a determining module 503, a processing module 504, and an updating module 505.

The monitoring module 501 is configured to monitor an event of user interaction, wherein the event of user interaction is a control act produced by a user handling a Flash currently played by the terminal by an input device.

The acquiring module 502 is configured to acquire Flash objects for implementing the event of user interaction when capturing the event, wherein the Flash objects comprise playing objects and computing objects, the playing objects comprise at least one of figures, images, words and sounds, and the computing objects refer to operating logics which process the playing objects to implement the event.

The determining module 503 is configured to determine computing objects operable by the terminal and computing objects inoperable by the terminal in the acquired Flash objects in accordance with its own computing resources.

The processing module 504 is configured to operate the computing objects operable by the terminal to obtain first playing data for implementing the event, notify the computing objects inoperable by the terminal to a server, and receive second playing data returned and obtained by the server operating the computing objects inoperable by the terminal.

The updating module 505 is configured to update the Flash currently played in accordance with the first playing data and the second playing data and play the first playing data and the second playing data, wherein the first playing data and the second playing data comprise display data and sound data.

In the embodiment of the invention, the acquiring module 502 is configured to download the Flash objects for implementing the event from the server, wherein the playing objects in the Flash objects are low consuming resources processed by the server.

Figure 8:
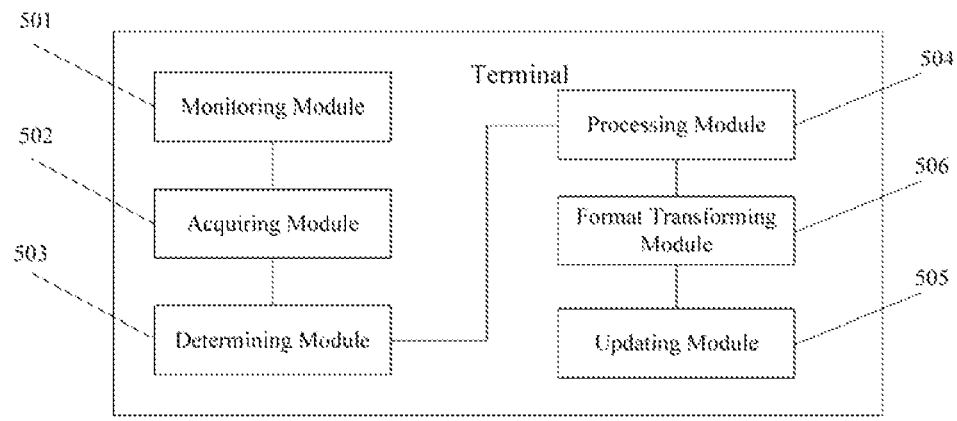
FIG. 8 is a structure diagram of a terminal apparatus provided by another embodiment of the invention.

Furthermore, as shown in FIG. 8, the terminal shown in FIG. 7 can further include a format transforming module 506 configured to transform the first playing data and the second playing data to data of Hyper Text Mark-up Language (HTML) format.

More preferably, the terminal can further comprise a first detecting module, a first gate limiting value module and a first notifying module, which are not specifically shown.

The first detecting module is configured to detect whether the fluency of the Flash currently played is less than a first threshold when operating the computing objects operable by the terminal.

The first gate limiting value module is configured to detect whether the carrying capacities of the current transmission resources and the current computing resources of the server are larger than a first gate limiting value, if it is detected that the fluency of the Flash currently played is less than the first threshold.

The first notifying module is configured to alter all or part of the computing objects, which are not operated, operable by the terminal to the computing objects inoperable by the terminal and notify the altered computing objects inoperable by the terminal to the server, if the detecting result of the first gate limiting value module is that the carrying capacities of the current transmission resources and the current computing resources of the server are larger than the first gate limiting value.

More preferably, the terminal can further comprise a first receiving module which is not specifically shown. The first receiving module is further configured to receive a notification sent by the server, wherein the notification is configured to identify the altered computing objects operable by the terminal, which are computing objects altered by the server by the following process: in the process of operating the computing objects inoperable by the terminal, detecting whether the current computing load of the server is larger than a second threshold; if it is detected that the current computing load of the server is larger than the second threshold, then further detecting whether the carrying capacities of the current transmission resources and the current computing resources of the terminal are larger than a second gate limiting value; if it is detected that the carrying capacities of the current transmission resources and the current computing resources of the terminal are larger than the second gate limiting value, then altering all or part of the computing objects, which are not operated, inoperable by the terminal.

The processing module is further configured to operate the computing objects, which are altered by the first receiving module, operable by the terminal to obtain the first playing data for implementing the event.

Furthermore, the terminal can also comprise a receiver, a processor, a transmitter, a memory, and one or more programs, wherein the one or more programs are stored in the memory and are configured to be executed by one or more processors. In the embodiment, the acquiring module 502 and the first receiving module can be implemented by the receiver, the monitoring module 501, the determining module 503, the updating module 505, the format transforming module 506, the first detecting module, and the first gate limiting value module can be implemented by the processor, and the first notifying module can be implemented by the transmitter. However, in the processing module, the receiving logic can be implemented by the receiver, the processor logic can be implemented by the processor, and the transmitting logic can be implemented by the transmitter.

Figure 9:
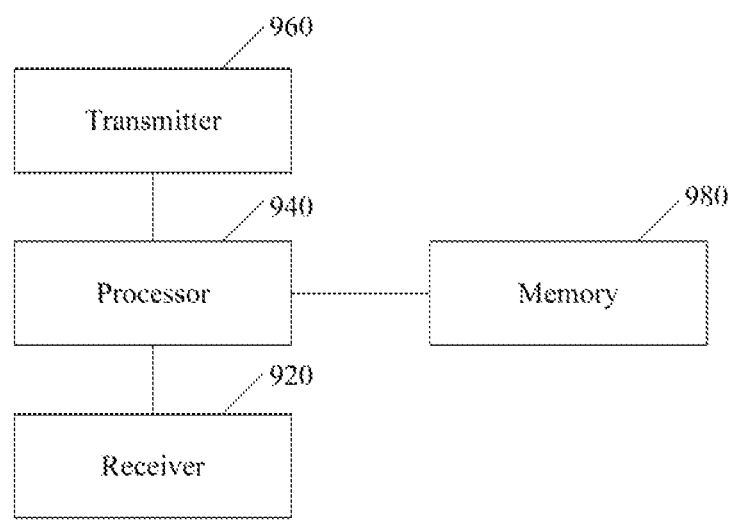
FIG. 9 is a structure diagram of a server provided by an embodiment of the invention.

As shown in FIG. 9, an embodiment of the invention provides a server, which can be specifically the same as that described in the method embodiment shown in FIG. 3. The server comprises a receiver 920, a processor 940, a transmitter 960, a memory 980, and one or more programs stored in the memory 980 and configured to be executed by one or more processors 940. Wherein:

The receiver 920 is configured to receive a notification sent by a terminal, wherein the notification is configured to identify computing objects inoperable by the terminal, which are obtained by the terminal when determining computing objects operable by the terminal and the computing objects inoperable by the terminal in acquired Flash objects in accordance with its own computing resources, and the Flash objects are Flash objects for implementing an event of user interaction acquired when the terminal monitors the event of user interaction and captures the event of user interaction.

The processor 940 is configured to operate the computing objects inoperable by the terminal to obtain second playing data for implementing the event.

The transmitter 960 is configured to send the second playing data obtained by operating the computing objects inoperable by the terminal to the terminal so that the terminal updates a Flash currently played in accordance with first playing data and the second playing data and plays the first playing data and the second playing data, wherein the first playing data is playing data for implementing the event obtained by the terminal operating the computing objects operable by the terminal.

Preferably, the receiver 920 is further configured to receive another notification sent by the terminal, wherein the other notification is configured to identify altered computing objects inoperable by the terminal, which are altered by the terminal by the following process: in the process of operating the computing objects operable by the terminal, detecting whether the fluency of the Flash currently played is less than a first threshold; if it is detected that the fluency of the Flash currently played is less than the first threshold, then detecting the carrying capacities of current transmission resources and current computing resources of the server are larger than a first gate limiting value; if it is detected that the carrying capacities of the current transmission resources and the current computing resources of the server are larger than the first gate limiting value, then altering all or part of computing objects, which are not operated, operable by the terminal.

The processor 940 is further configured to operate the altered computing objects inoperable by the terminal to obtain the second playing data for implementing the event.

Preferably, the processor 940 is further configured to detect whether a current computing load of the server is larger than a second threshold when operating the computing objects inoperable by the terminal.

The processor 940 is further configured to detect whether the carrying capacities of the current transmission resources and the current computing resources of the terminal are larger than a second gate limiting value, if it is detected that the current computing load of the server is larger than the second threshold.

The processor 940 is further configured to alter all or part of the computing objects, which are not operated, inoperable by the terminal to the computing objects operable by the terminal if it is detected that the carrying capacities of the current transmission resources and the current computing resources of the terminal are larger than the second gate limiting value, and control the transmitter 960 to notify the altered computing objects operable by the terminal to the terminal.

The person skilled in the art should appreciate that all or a part of the steps implementing the above embodiments can be completed by hardware or completed by instructing hardware via programs, which can be stored within a computer readable storage medium, such as a read only memory, a magnetic disk, an optical disk, and so on. The described computer readable storage medium stores one or more programs, which are executed by one or more processors to implement the method for display control provided by the embodiment shown in FIG. 2 and the method for display control provided by the embodiment shown in FIG. 3.

The above described embodiments are merely preferred embodiments of the invention, but not intended to limit the invention. Any modifications, equivalent alternations and improvements that are made within the spirit and scope of the invention should be included in the protection scope of the invention.

What is claimed is:

1. A method for display control comprising:
   monitoring, by a terminal, an event of user interaction, wherein the event is a control act produced by a user handling a Flash currently played by the terminal via an input device; acquiring, by the terminal, Flash objects for implementing the event of user interaction when capturing the event, wherein the Flash objects comprise playing objects and computing objects, the playing objects comprise at least one of figures, images, words and sounds, and the computing objects refer to operation logics which process the playing objects to implement the event;
   determining, by the terminal, computing objects operable by the terminal and computing objects inoperable by the terminal in the acquired Flash objects in accordance with its own computing resources;
   by the terminal, operating the computing objects operable by the terminal to obtain first playing data for implementing the event, notifying the computing objects inoperable by the terminal to a server, and receiving second playing data returned and obtained by the server operating the computing objects inoperable by the terminal;
   by the terminal, updating a Flash currently played in accordance with the first playing data and the second playing data and playing the first playing data and the second playing data, wherein the first playing data and the second playing data comprise display data and sound data.

2. The method of claim 1, wherein said acquiring comprises:
   downloading the Flash objects for implementing the event from the server, wherein the computing objects in the Flash objects are low consuming resources processed by the server.

3. The method of claim 1, wherein before by the terminal, updating the Flash currently played in accordance with the first playing data and the second playing data and playing the first playing data and the second playing data, the method further comprises:
  transforming, by the terminal, the first playing data and the second playing data to data of Hyper Text MarkUp Language (HTML) format.

4. The method of claim 1, wherein the method further comprises:
  in the process of operating the computing objects operable by the terminal, by the terminal, detecting whether the fluency of the Flash currently played is less than a first threshold, further detecting whether the carrying capacities of current transmission resources and current computing resources of the server are larger than a first gate limiting value if it is detected that the fluency of the Flash currently played is less than the first threshold, altering all or part of the computing objects, which are not operated, operable by the terminal to the computing objects inoperable by the terminal if it is detected that the carrying capacities of the current transmission resources and the current computing resources of the server are larger than the first gate limiting value, and notifying the altered computing objects inoperable by the terminal to the server.

5. The method of claim 1, wherein the method further comprises:
  receiving, by the terminal, a notification sent by the server, wherein the notification is configured to identify altered computing objects operable by the terminal, which are computing objects altered by the server by the following process: in the process of operating the computing objects inoperable by the terminal, detecting whether the current computing load of the server is larger than a second threshold, further detecting whether the carrying capacities of current transmission resources and current computing resources of the terminal are larger than a second gate limiting value if it is detected that the current computing load of the server is larger than the second threshold, and altering all or part of the computing objects, which are not operated, inoperable by the terminal if it is detected that the carrying capacities of the current transmission resources and the current computing resources of the terminal are larger than the second gate limiting value;
  operating, by the terminal, the altered computing objects operable by the terminal to obtain the first playing data for implementing the event.

6. A method for display control, comprising:
  receiving, by a server, a notification sent by a terminal, wherein the notification is configured to identify computing objects inoperable by the terminal, which are obtained by the terminal when determining computing objects operable by the terminal and computing objects inoperable by the terminal in acquired Flash objects in accordance with its own computing resources, and the Flash objects are Flash objects for implementing an event of user interaction acquired by the terminal when monitoring the event of user interaction and capturing the event of user interaction;
  operating, by the server, the computing objects inoperable by the terminal to obtain second playing data for implementing the event;
  sending, by the server, the second playing data obtained by operating the computing objects inoperable by the terminal to the terminal so that the terminal updates a Flash currently played in accordance with first playing data and the second playing data and plays the first playing data and the second playing data, wherein the first playing data is playing data for implementing the event obtained by the terminal operating the computing objects operable by the terminal.

7. The method claim 6, wherein the method further comprises:
  receiving, by the server, another notification sent by the terminal, wherein the other notification is configured to identify altered computing objects inoperable by the terminal, which are computing objects altered by the terminal by the following process: in the process of operating the computing objects operable by the terminal, detecting whether the fluency of a Flash currently played is less than a first threshold, further detecting whether the carrying capacities of current transmission resources and current computing resources of the server are larger than a first gate limiting value if it is detected that the fluency of the Flash currently played is less than the first threshold, and altering all or part of the computing objects, which are not operated, operable by the terminal if it is detected that the carrying capacities of the current transmission resources and the current computing resources of the server are larger than the first gate limiting value;
  operating, by the server, the altered computing objects inoperable by the terminal to obtain the second playing data for implementing the event.

8. The method of claim 6, wherein the method further comprises:
  in the process of operating the computing objects inoperable by the terminal, by the server, detecting whether a current computing load of the server is larger than a second threshold, further detecting whether the carrying capacities of current transmission resources and current computing resources of the terminal are larger than a second gate limiting value if it is detected that the current computing load of the server is larger than the second threshold, altering all or part of the computing objects, which are not operated, inoperable by the terminal to the computing objects operable by the terminal if it is detected that the carrying capacities of the current transmission resources and the current computing resources of the terminal are larger than the second gate limiting value, and notifying the altered computing objects operable by the terminal to the terminal.

9. A terminal comprising a processor, a memory, a receiver and a transmitter, wherein:
  the processor is configured to monitor an event of user interaction, wherein the event of user interaction is a control act produced by a user handling a Flash current played by the terminal via an input device;
  the processor is further configured to acquire Flash objects for implementing the event of user interaction when capturing the event, wherein the Flash objects comprise playing objects and computing objects, the playing objects comprise at least one of figures, images, words and sounds, and the computing objects refer to operation logics which process the playing objects to implement the event;
  the processor is further configured to determine computing objects operable by the terminal and computing objects inoperable by the terminal in acquired Flash objects in accordance with its own computing resources;

the processor is further configured to operate the computing objects operable by the terminal to obtain first playing data for implementing the event;

the transmitter is configured to notify the computing objects inoperable by the terminal to a server;

the receiver is configured to receive second playing data returned and obtained by the server operating the computing objects inoperable by the terminal;

the processor is further configured to update a Flash currently played in accordance with the first playing data and the second playing data and plays the first playing data and the second playing data, wherein the first playing data and the second playing data comprise display data and sound data.

10. The terminal of claim 9, wherein the processor is further configured to download the Flash objects for implementing the event from the server via the receiver, wherein the playing objects in the Flash objects are low consuming resources processed by the server.

11. The terminal of claim 9, wherein the processor is further configured to transform the first playing data and the second playing data to data of Hyper Text MarkUp Language (HTML) format.

12. The terminal of claim 9, wherein the processor is further configured to detect whether the fluency of the Flash currently played is less than a first threshold in the process of operating the computing objects operable by the terminal;

the processor is further configured to further detect whether the carrying capacities of current transmission resources and current computing resources of the server are larger than a first gate limiting value if it is detected that the fluency of the Flash currently played is less than the first threshold;

the processor is further configured to alter all or part of the computing objects, which are not operated, operable by the terminal to the computing objects inoperable by the terminal if it is detected that the carrying capacities of the current transmission resources and the current computing resources of the server are larger than the first gate limiting value and control the transmitter to notify the altered computing objects inoperable by the terminal to the server.

13. The terminal of claim 9, wherein the receiver is further configured to receive a notification sent by the server, wherein the notification is configured to identify altered computing objects operable by the terminal, which are altered by the server by the following process: in the process of operating the computing objects inoperable by the terminal, detecting whether a current computing load of the server is larger than a second threshold, further detecting whether the carrying capacities of current transmission resources and current computing resources of the terminal are larger than a second gate limiting value if it is detected that the current computing load of the server is larger than the second threshold, and altering all or part of the computing objects, which are not operated, inoperable by the terminal if it is detected that the carrying capacities of the current transmission resources and the current computing resources of the terminal are larger than the second gate limiting value;

the processor is further configured to operate the altered computing objects operable by the terminal to obtain the first playing data for implementing the event.

14. A server comprising a receiver, a processor, a memory and a transmitter, wherein:

the receiver is configured to receive a notification sent by a terminal, wherein the notification is configured to identify computing objects inoperable by the terminal, which are obtained by the terminal when determining computing objects operable by the terminal and computing objects inoperable by the terminal in acquired Flash objects in accordance with its own computing resources, and the Flash objects are Flash objects for implementing an event of user interaction which are acquired by the terminal when monitoring the event of user interaction and capturing the event of user interaction;

the processor is configured to operate the computing objects inoperable by the terminal to obtain second playing data for implementing the event;

the transmitter is configured to send the second playing data obtained by operating the computing objects inoperable by the terminal to the terminal so that the terminal updates a Flash currently played in accordance with first playing data and the second playing data and plays the first playing data and the second playing data, wherein the first playing data is playing data for implementing the event obtained by the terminal operating the computing objects operable by the terminal.

15. The server of claim 14, wherein:

the receiver is further configured to receive another notification sent by the terminal, wherein the other notification is configured to identify altered computing objects inoperable by the terminal, which are computing objects altered by the terminal by the following process: in the process of operating the computing objects operable by the terminal, detecting whether the fluency of a Flash currently played is less than a first threshold, further detecting whether the carrying capacities of current transmission resources and current computing resources of the server are larger than a first gate limiting value if it is detected that the fluency of the Flash currently played is less than the first threshold, and altering all or part of the computing objects, which are not operated, operable by the terminal if it is detected that the carrying capacities of the current transmission resources and the current computing load of the server are larger than the first gate limiting value;

the processor is further configured to operate the altered computing objects inoperable by the terminal to obtain the second playing data for implementing the event.

16. The server of claim 14, wherein:

the processor is further configured to detect whether a current computing load of the server is larger than a second threshold in the process of operating the computing objects inoperable by the terminal;

the processor is further configured to detect whether the carrying capacities of current transmission resources and current computing resources of the terminal are larger than a second gate limiting value if it is detected that the current computing load of the server is larger than the second threshold;

the processor is further configured to alter all or part of the computing objects, which are not operated, inoperable by the terminal to the computing objects operable by the terminal if it is detected that the carrying capacities of the current transmission resources and the current computing resources of the terminal are larger than the second gate limiting value and controls the transmitter to notify the altered computing objects operable by the terminal to the terminal.

* * * * *